INVENTOR:
RICHARD A. SHIVE

United States Patent Office 3,490,257
Patented Jan. 20, 1970

3,490,257
APPARATUS FOR EXPANDING PASSAGEWAY PANELS
Richard A. Shive, Madison, Ill., assignor to Olin Mathieson Chemical Corporation, a corporation of Virginia
Original application Oct. 5, 1964, Ser. No. 401,474, now Patent No. 3,368,258. Divided and this application Dec. 1, 1967, Ser. No. 687,332
Int. Cl. B21d 22/10
U.S. Cl. 72—61                6 Claims

ABSTRACT OF THE DISCLOSURE

An apparatus for expanding roll-bonded structural panels comprising a pair of dies, flexible sealing means having at least one dimension greater than the panel, and an insert located between the dies contacting at one end thereof the sealing means and overlapping the panel at an opposite end to effect a seal.

---

This application is a division of Ser. No. 401,474, filed Oct. 5, 1964, now Patent No. 3,368,258.

The present invention relates to a process for the preparation of expanded pressure-welded passageway panels. More particularly, the present invention relates to a process for the preparation of passageway panels of the above type wherein the passageways are bulged out of the plane of one side of the panel and wherein the other side of the panel is substantially flat.

In the conventional expansion of pressure-welded panels containing a non-welded passageway pattern corresponding to a predetermined design of weld inhibiting material, hydraulic expansion of the non-welded pattern results in passageways bulged out of both sides of the panel. For numerous applications, it is desirable to expand pressure-welded passageway panels on one side only, leaving the opposing side substantially flat. The major reason for using one side flat parts is when conventional panels are used as refrigerator evaporators they suffer mechanical damage in field service due to ice picks and table knives, etc., used to chip frost or ice from the bottom of the evaporator. One side flat parts overcome this problem to a great extent.

Previous methods for forming panels of this type have been subject to one or more significant disadvantages. For example, one method for preparing this type of panel utilizes a reciprocating pair of press platens and places the panel to be inflated between said platens. One face of said platen confronting the panel is substantially flat and the other has an annular, circumferential seal which forms a hollow chamber. The panel is held in place between the flat face and the circumferential seal and the passageways are inflated into the hollow chamber, with the side adjacent the substantially flat face being held substantially flat.

While this method successfully provides one side flat parts, it is subject to a significant disadvantage. If the panel is smaller than the circumferential seal, additional and wasteful expense is attendant upon the expansion process. One method for expanding panels too small to be held in place between the circumferential seal is to provide excess metal larger than that needed for the desired panel. Necessarily in this process, the extra metal must be trimmed and is subsequently lost as scrap. In another alternative, separate dies are prepared to accommodate the varying sizes of panels needed. However, the substantial cost involved in preparing these dies renders this process wasteful on a commercial scale.

Accordingly, it is a principal object of the present invention to provide an improved process for the preparation of expanded, pressure-welded, passageway panels having one side thereof substantially flat.

It is a further object of the present invention to provide a process as aforesaid which enables the expansion of small passageway panels on dies heretofore too large to be utilized.

It is a further object of the present invention to provide a process as aforesaid which enables the preparation of passageway panels with a minimum of scrap and a considerble saving in metal cost and also enables greater utilization of existing dies and a savings in die set-up time.

It is a still further object of the present invention to provide a process for the preparation of one side flat passageway panels which is characterized by a considerable savings on a commercial scale.

It is a further object of the present invention to provide apparatus for expansion of a panel utilizing novel sealing structure.

It is another object of the present invention to provide apparatus in which an insert and a panel overlap to effect sealing of an expansion chamber.

Further objects and advantages of the present invention will appear hereinafter.

In accordance with the present invention, it has now been found that the foregoing objects of the present invention may be conveniently accomplished. The present invention is a method of preparing an expanded, pressure-welded passageway panel having one side thereof substantially flat. The process of the present invention comprises: providing a pressure-welded panel containing internally therein a non-welded passageway pattern corresponding to a predetermined design of weld inhibiting material; placing said panel between a pair of relatively movable dies, one of said dies having a substantially flat face confronting said panel and the other of said dies having an annular circumferential seal forming a hollow chamber confronting said panel, said seal exceeding the dimension of said panel; interposing an insert between said panel and the flat face of said die, said insert extending from the panel to the seal in the area wherein said seal exceeds the dimension of the panel; closing the dies and interposed insert onto the panel; and inflating said non-welded portions into said hollow chamber.

The present invention will be described in greater detail with reference to the accompanying drawings in which.

In the fabrication of hollow sheet metal panels of the aforementioned type, two or more sheets of metal are arranged in a stack-like fashion with a design of weld inhibiting material applied to a portion of one of the adjacent faces of the sheets in a pattern corresponding to the desired system of fluid passageways. The sheets are then welded together in the areas thereof not separated by the weld inhibiting material, as by hot rolling to form a sheet metal blank. If the sheets are welded together by hot rolling they are elongated in the direction of rolling and therefore the passageway design of weld inhibiting material must be foreshortened in the intended direction of rolling when it is applied to the sheet. Subsequent to the welding step the sheets are usually softened, as by annealing, and the unjoined portion corresponding to the pattern of weld inhibiting material is hydraulically outwardly expanded as by the injection therein of a fluid pressure of sufficient magnitude to distend the sheets in the area adjacent the weld inhibiting design, thereby forming a hollow passageway panel. The aforementioned process is fully described in the patent to Grenell, U.S. 2,690,002, issued Sept. 28, 1954.

The preferred types of metals used in this process are aluminum and its alloys, although a wide variety of other materials may be used, e.g. copper and its alloys, etc.

The present invention as aforesaid is concerned with the foregoing process whereby one side of the pressure welded passageway panel is kept substantially flat and the opposing side of the pressure-welded panel contains the passageways bulged out of the plane of the panel.

Figure 1:
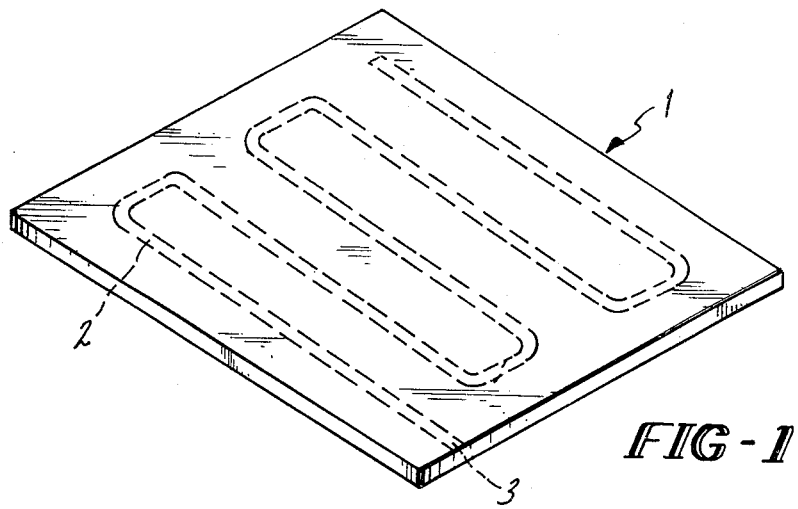
FIGURE 1 is a perspective view of a pressure-welded panel containing internally therein a non-welded passageway pattern.
Figure 2:
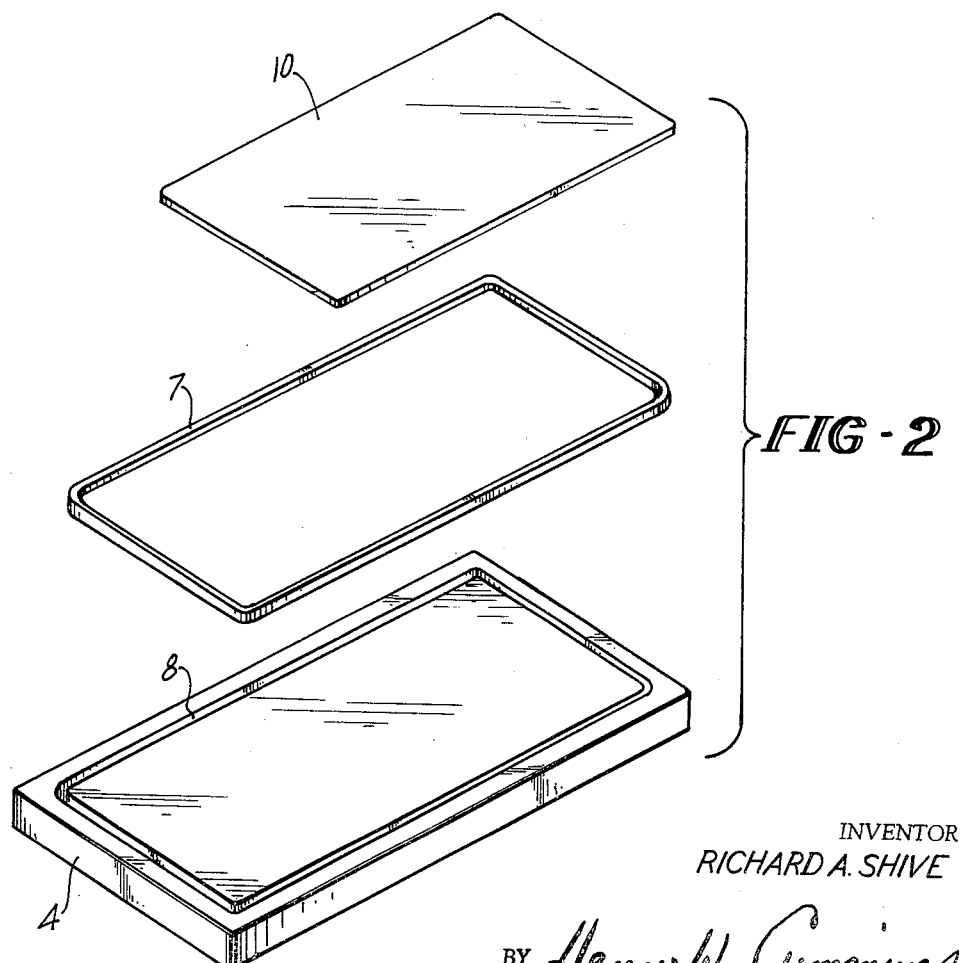
FIGURE 2 is an exploded view in perspective of showing one die platen, the circumferential seal and the insert.
Figure 3:
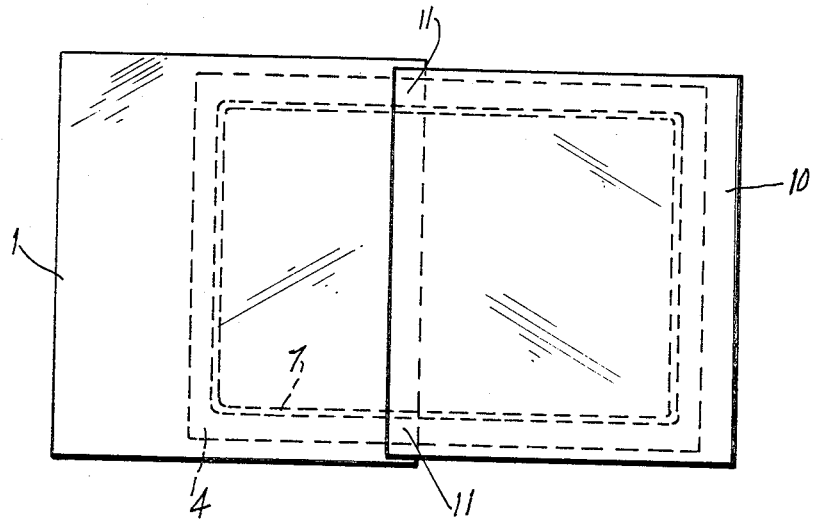
FIGURE 3 is a top view of the assembled components of FIGURE 2 including the passageway panel.
Figure 4:
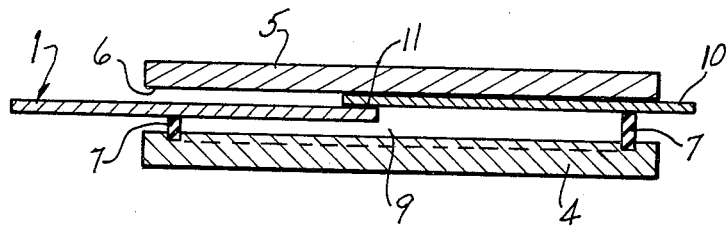
FIGURE 4 is a side view of the assembled components of FIGURE 3 including the upper die platen.

The present process will be more readily apparent from a consideration of the aforementioned drawings. Referring to the drawings, FIGURE 1 shows a pressure welded panel 1 containing internally therein a non-welded passageway pattern 2 corresponding to a predetermined pattern of weld inhibiting material. The design 2 may take any desired configuration depending upon the ultimate passageway pattern desired. The design 2 may be extended to the edge of the sheet as shown at 3 to subsequently form an inlet for fluid pressure injection. The design 2 is foreshortened prior to hot rolling in the intended direction of subsequent rolling so that the ultimate pressure-welded passageway contains the desired passageway configuration.

The panel 1 is placed between a pair of relatively movable dies 4 and 5. One of said dies, for example, the upper die 5 has a substantially flat face 6 confronting panel 1 and the other of said dies, for example, the lower die 4 has an annular circumferential seal 7 confronting panel 1.

The seal 7 is seated in an annular groove 8 and forms a hollow chamber 9 confronting panel 1.

In normal operation the dies 4 and 5 are closed tightly over panel 1 with the seal 7 forming a hollow chamber confronting the panel and said hollow chamber is pressurized with, for example, water or air. Fluid pressure, for example, hydraulic or air pressure, is then admitted internally of said panel 1 into passageways 2 through inlet 3 and expands the passageways into said hollow chamber 9. The annular seal 7 holds the panel 1 tightly against the flat face 6 of said upper platen 5.

In accordance with the present invention the panel 1 is too small to be tightly held around its entire periphery against the flat face 6 of upper platen 5. Therefore, insert 10 is interposed between panel 1 and flat face 6 of die 5 extending from the internal edge of panel 1 to the seal 7 in the area thereof wherein the seal exceeds the dimension of the panel. Normally an area of overlap 11 is provided between the internal edge of insert 10 and the internal edge of panel 1 so as to provide a seal therebetween upon the closing of dies 4 and 5. In operation, panel 1 is held tightly against flat face 6 of die 5 as panel 1 will bend under the pressure within chamber 9. Alternatively, the insert 10 may be extended the entire length of dies 4 and 5.

The particular material forming the seal 7 is not especially critical except that it should be of sufficient rigidity to hold the panel and insert in place and sufficiently flexible so as to prevent damage to the panel. An ideal seal is rubber.

Similarly, a wide variety of inserts may be employed, for example, the following may be conveniently used: aluminum; steel; rubber; formica; tempered masonite; or any solid material bonded with a flexible backing. In some cases, for example, when an aluminum or steel insert is used, it is preferred to utilize a secondary seal in the area of overlap 11 between the internal edge of insert 10 and the internal edge of panel 1. Typical materials which can be used include rubber, rubber bonded to the insert, Teflon bonded to the insert, or any suitable material.

In accordance with the present invention, there is accomplished a considerable savings in metal over conventional processes which provide excess metal in order to utilize conventional dies and in addition a considerable die saving afforded by the utilization of standard dies for the expansion of small panel parts.

Figure 5:
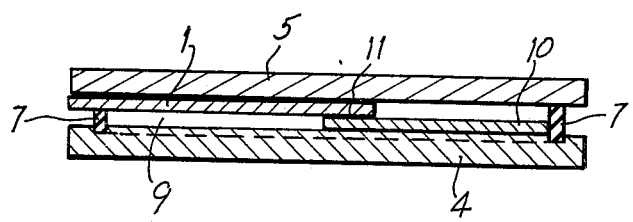
FIGURE 5 is a side view of assembled components showing an alternative embodiment of the present invention.

The present process is applicable to save on the coil of metal by the insertion of an insert 10 in FIGURE 5 of, for example, neoprene rubber inside the die extending in width from inside the rubber die seal 7 to the interior of the structure to fit below the panel 1 so that the panel 1 overlaps the insert 10 and is in sealing relationship therewith. The compression of the rubber insert and die seal will form their own seal. Similarly, the same type of procedure may be used to save on the cut of metal. In this case the insert must be full length of the die inside of the rubber seal to inside of the rubber and wide enough to cover both the edge of the panel with the other edge against the die seal. A combination of both of these procedures would naturally save on both cut and coil.

The insert may be held against the die platen by any desired method, for example, a water soluble glue may be conveniently employed. In addition, permanent magnets or simply pressure holding may be employed. The insert must overlap the panel to form the seal that would normally be formed if the panel were large enough to cover existing die seals.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. Apparatus for expanding structural panels made of two sheets of metal, said two sheets of metal having a pattern of weld inhibiting material on their opposed faces, said sheets being welded together at those sections not containing weld inhibiting material, said apparatus comprising a pair of dies, flexible sealing means located on one of said dies, at least one of the dimensions of said panel being less than the sealing means located on one of said dies, and an insert located between said dies and contacting at one end thereof said sealing means and overlapping said panel at an opposite end to effect a seal between said panel and said insert.

2. Apparatus according to claim 1 in which said insert is in contact with said upper die member and overlaps the upper surface of said panel.

3. Apparatus according to claim 1 in which said insert is in contact with said lower die member and is in contact with the lower surface of said panel.

4. Apparatus according to claim 1 in which said insert is made of flexible material.

5. Apparatus according to claim 1 in which said insert is made of metal and has flexible material in that portion of the insert which overlaps said panel.

6. Apparatus according to claim 3 in which said insert is made of flexible material.

References Cited

UNITED STATES PATENTS 2,949,876    8/1960    Staples _____ 29—157.3 X
3,095,843    7/1963    Thomas _____ 72—61
3,180,011    4/1965    Hever _____ 29—421 X JOHN F. CAMPBELL, Primary Examiner D. C. REILEY, Assistant Examiner U.S. Cl. X.R.

29—202, 421